United States Patent
Maeshima (10) Patent No.: US 8,078,959 B2
(45) Date of Patent: Dec. 13, 2011

(54) IMAGE PROCESSING APPARATUS

(75) Inventor: Toshiyuki Maeshima, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 971 days.

(21) Appl. No.: 11/397,151

(22) Filed: Apr. 4, 2006

(65) Prior Publication Data

US 2007/0019231 A1    Jan. 25, 2007

(30) Foreign Application Priority Data

Jul. 19, 2005  (JP) ................................ 2005-208562

(51) Int. Cl.
*G06F 17/40* (2006.01)

(52) U.S. Cl. ...................................................... 715/234

(58) Field of Classification Search ................ 358/1.15; 715/513, 234
See application file for complete search history.

(56) References Cited

U.S. PATENT DOCUMENTS

| | | | |
|---|---|---|---|
| 2002/0091878 A1* | 7/2002 | Lee | 710/1 |
| 2003/0227651 A1* | 12/2003 | Mathieson | 358/1.16 |
| 2004/0061913 A1* | 4/2004 | Takiguchi | 358/524 |
| 2005/0005130 A1* | 1/2005 | Okigami | 713/183 |
| 2005/0280836 A1* | 12/2005 | Ferlitsch | 358/1.1 |

FOREIGN PATENT DOCUMENTS

| | | |
|---|---|---|
| JP | 06-318998 A | 11/1994 |
| JP | 07-143302 A | 6/1995 |
| JP | 2002-209079 A | 7/2002 |
| JP | 2004-199409 A | 7/2004 |

OTHER PUBLICATIONS

Japanese Office Action dated Apr. 6, 2010 and English translation thereof issued in counterpart Japanese Application No. 2005-208562.

* cited by examiner

*Primary Examiner* — Laurie Ries
*Assistant Examiner* — Tionna Smith
(74) *Attorney, Agent, or Firm* — Holtz, Holtz, Goodman & Chick, PC (57) ABSTRACT

There is described an image processing apparatus, which makes it possible to prevent a leakage of secrecy caused by the output operation of a report with image information, without loosing merits of the report with image information. The image processing apparatus includes: a report generating section to generate a report with image information, wherein the report shows a processing status of a job and the image information relates the job; a storage section to store the report with the image information; a reception section to accept an order for outputting the report with the image information stored in the storage section; an output section to output the report with the image information ordered at the reception section; and an inform section to inform that the report with the image information is generated, when the determining section determines that the report is the report with the image information.

28 Claims, 9 Drawing Sheets

PRINTOUT OF IMAGE-ATTACHED REPORT(SELECTION DISPLAY) — 550

| No. | TRANSMISSION ENDED AT | STATUS | NO. OF COPIES | USER ID |
|---|---|---|---|---|
| 001 | 2005 / 05 / 11 12:35 | WAITING | 1 | Taro |
| 002 | 2005 / 05 / 14 18:12 | WAITING | 1 | Taro |
| 003 | 2005 / 06 / 08 15:23 | WAITING | 1 | Taro |
| 004 | 2005 / 06 / 12 14:23 | WAITING | 1 | Taro |

SELECT ALL    Print    Cancel

FIG. 11

SELECT BOXES — 570

CONFIDENTIAL BOX

| 0001 | 0003 |
|---|---|
| 0002 | 0004 |

PERSONAL BOX

| Taro | Jiro | Shiro |
|---|---|---|
| Hanako | Saburo | |

IMAGE PROCESSING APPARATUS

RELATED APPLICATION

This application is based on Japanese Patent Application NO. 2005-208562 filed on Jul. 19, 2005 in Japanese Patent Office, the entire content of which is hereby incorporated by reference.

BACKGROUND

1. Field of the Invention

This invention relates to an image processing apparatus capable of outputting a job report which indicates a processing status of a job together with images which are related to the job and particularly, to a technology to prevent leaks of secrets resulting from output of reports containing image information.

2. Description of the Related Art

Some image processing apparatus have a function to output a report to inform its user of a processing state of an image data processing job. For example, such a function is typified by a transmission report function of facsimile equipment which prints out a result of transmission of image data on recording paper together with a receiver's facsimile number.

This transmission report function can add one of images sent by a job to a report so that the user can identify a job by the image added to the transmission report at a glance. Usually, the image-attached report contains an image of the first page.

Usually, a transmission report is automatically output when a job is completed or when a predetermined number of reports are made. Accordingly, the transmission report may be made while the user is away from the apparatus. In such a case, personal information in the transmission report such as a facsimile number, a receiver's name, and transmitted images may be stealthily read out by third persons. If the information is confidential, an information leak problem occurs.

To protect secret information, a technology has been proposed which causes the user to select secret items in advance and make the selected items unprinted in its transmission report (For example, see Patent Document 1).

[Patent Document 1]
Tokkai 2004-199409 (Japanese Non-Examined Patent Publication)

On reports with image information, a method of making image information blanked can give the same effect as that of a method of making image information unprinted.

However, the object of providing an image-attached report is to enable the user to identify a job by the attached image at a glance. Therefore, when the image information is unprinted, the original purpose of the transmission report will be lost. Therefore, both the merit of reports with image information and prevention of secret leaks cannot be satisfied by applications of the technology that outputs transmission reports having selected items unprinted.

SUMMARY

To overcome the abovementioned drawbacks in conventional image-recording apparatus, it is an object of the present invention to provide an image processing apparatus, which makes it possible to prevent a leakage of secrecy caused by the output operation of the reports with image information, without loosing the merit of reports with image information.

In view of foregoing, an object of this invention is to solve at least one of the problems, and to provide a new image processing apparatus. The apparatus comprises, a report generating section to generate a report with image information, wherein the report shows a processing status of a job and the image information relates the job; a storage section to store the report with the image information; a reception section to accept an order for outputting the report with the image information stored in the storage section; and an output section to output the report with the image information ordered at the reception section.

According to another aspect of the present invention, the image processing apparatus comprises a report generating section to generate a report with image information or a report without the image information, wherein the report shows a processing status of a job and the image information relates the job; a determining section to determine that a report is the report with the image information or the report without the image information; a storage section to store the report with the image information, when the determining section determines that the report is the report with the image information; a reception section to accept an order for outputting the report with the image information stored in the storage section; and an output section to output the report with the image information ordered at the reception section.

According to another aspect of the present invention, the image processing apparatus comprises a report generating section to generate a report with image information or a report without the image information, the report shows a processing status of a job and the image information relates the job; a determining section to determine that a report is the report with the image information or the report without the image information; an inform section to inform that the report with the image information is generated, when the determining section determines that the report is the report with the image information; a reception section to accept an order for outputting the report with the image information; and an output section to output the report with the image information ordered at the reception section.

The invention itself, together with further objects and attendant advantages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Below will be explained some preferred embodiments of this invention in reference to accompanying drawings.

Figure 1:
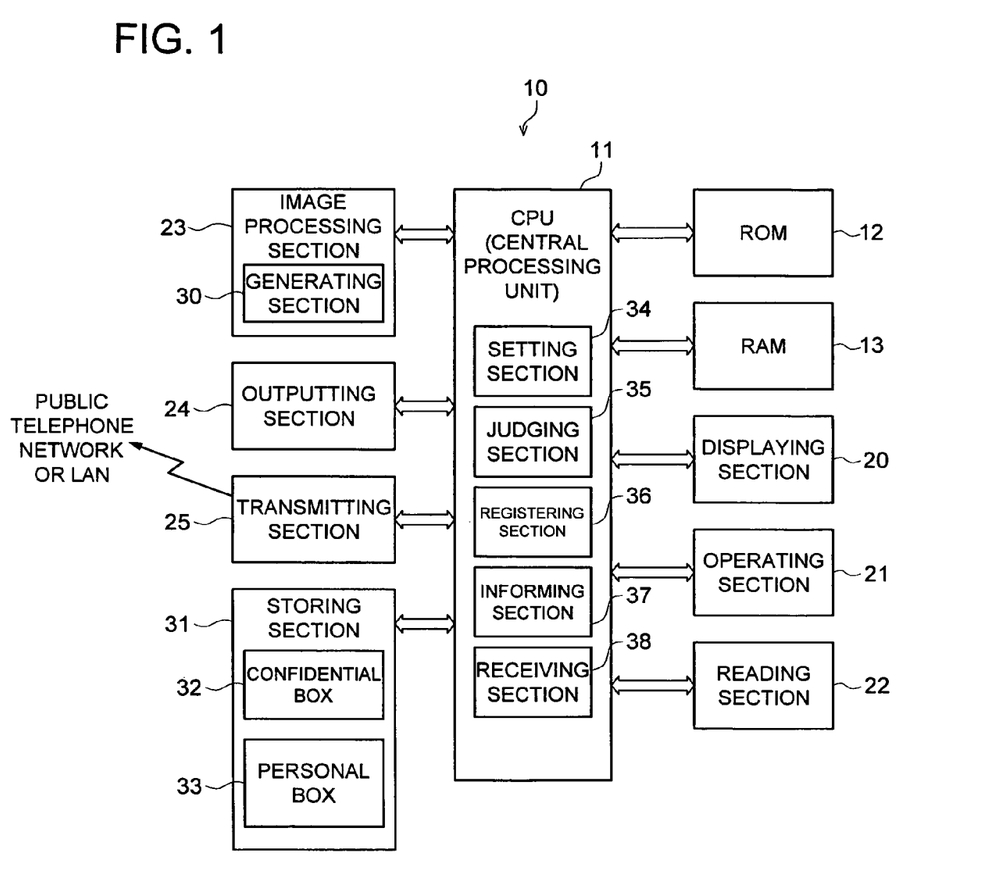
FIG. 1 shows an electric functional block diagram of an image processing apparatus, which is a preferred embodiment of this invention.

FIG. 1 shows an electric functional block diagram of image processing apparatus 10 which is a preferred embodiment of this invention.

Image processing apparatus 10 is built up as a multi-function machine equipped with some kinds of image processing functions such as a facsimile function for sending and receiving image data over public telephone networks, a copying function for reading documents and making their copies on recording paper, a scanner function for scanning image and sending the image data, and a printer function for receiving print data and printing according to the print data.

Image processing apparatus 10 is equipped with an electric circuit which mainly contains a CPU (short for Central Processing Unit) 11 which works as a controller to generally control the operation of image processing apparatus 10, ROM (short for Read Only Memory) 12, and RAM (short for Random Access Memory) 13.

ROM 12 stores programs to be executed by CPU 11 and various kinds of fixed data. RAM 13 works as work memory which temporarily stores various kinds of data when CPU 11 executes a program and as page memory which stores image data of at least one page for image rotation and so on.

Further, CPU 11 is connected to displaying section 20, operating section 21, reading section 22, image processing section 23, outputting section 24, and transmission section 25.

Displaying section 20 is a liquid crystal display and has a function to display guidance and states for the user. Further, displaying section 20 also functions as an informing section (to be explained later).

Operating section 21 is equipped with various kinds of operation switches and a touch-sensitive panel which covers the surface of displaying section 20. Operating section 21 has a function to accept various kinds of operations made by the user.

When starting to use image processing apparatus 10, the user enters a predetermined user identification (ID) from operating section 21. The user also enters a password if necessary. The password is a user-set arbitrary character string as output authentication information which is used to authenticate an authority to read data from a predetermined storage area. The entered user ID and password are stored in RAM 13.

Reading section 22 functions to read document images and fetches corresponding image data. Reading section 22 is equipped with a light source which illuminates a document, a line image sensor which reads each line on the document perpendicularly to the movement of the document, a moving section which moves the line-by-line reading position along the movement of the document, and an optical path which contains lenses and mirrors to guide light reflected on the document to the line image sensor to focus thereof. The line image sensor is made of charge-coupled devices (CCD). An analog image signal from the line image sensor is converted into a digital signal (A/D conversion) and fetched as digital image data.

Image processing section 23 has a function to enlarge and shrink image data and a function to rotate an image.

Outputting section 24 works to electro photographically form an image corresponding to image data on recording paper and print it out. Outputting section 24 is constructed as a laser printer which is equipped with a recording paper conveyor, photoreceptor drum, charger, laser unit, developing unit, transfer separator, cleaning unit, and fixing unit. Incidentally, in this invention, "output" means not only printing out on recording paper by the outputting section 24, but also displaying by the displaying section 20, and sending to the outside of the image forming apparatus by the transmission section 25.

Transmission section 25 works as a unit for transmitting and receiving image data over a public telephone network. Transmission section 25 has a facsimile function which transfers various kinds of control signals and image data to and from remote terminals based on the G3 (Group 3) facsimile transmission control protocol which defines the transmission standard by Recommendation T.30 of ITU-T (International Telecommunication Union Telecommunication standardization sector).

Transmission section 25 also has a function to transfer image data to and from other network equipment connected to a LAN (Local Area Network) via Ethernet (registered trade mark) and PC (personal computers) connected via a printer connection cable or RS-232C (Recommended Standard 232C).

Image processing section 23 has a function as generating section 30 which generates image data (hereinafter called transmission report data) to be printed out as a transmission report. Generating section 30 can generate two kinds of transmission report data. One is a no-image report which contains information about processing status of an image data transmission job. The other is an image-attached report which contains the image processing state information and image information of the first page of the image data related to a transmission job.

Information in the no-image report contains transmission-completion date and time, transmission time required between start and end of transmission, transaction number for transmission job management, destination facsimile number, number of transmitted pages, and result of transmission such as success of failure of transmission. These pieces of information are output from CPU 11 to generating section 30, rasterized by the generating section 30, and rearranged on predetermined positions. This makes transmission report data to be output as a no-image report (hereinafter called no-image report data).

An image-attached report contains the same kinds of information as those of the no-image report and image information of the first page of image data related to the transmission job. The image information in the image-attached report is output from RAM 13 to generating section 30, enlarged or shrunk there to be in a predetermined area on recording paper, rearranged on predetermined positions. This makes transmission report data to be output as an image-attached report (hereinafter called image-attached report data).

CPU 11 is further connected to storing section 31. Storing section 31 is a shared non-volatile memory which stores image-attached report data of all users that use image processing apparatus 10. The non-volatile memory is rewritable memory that can retain the stored information even when not powered. When image-attached report data is stored in the storing section 31, CPU 11 judges that the image-attached report data is waiting to be output. When print-output from the storing section 31, the image-attached report data is deleted from the storing section 31.

Each piece of image-attached report data stored in the storing section 31 is associated with user identification information of the report data to identify a user who instructed execution of a job. The user identification information contains a user ID which is required to log in image processing apparatus 10.

Further, each piece of image-attached report data stored in the storing section 31 also contains information to authenticate authority of a user who entered a command to output the image-attached report. A password which is entered, if necessary, together with a user ID is adopted as the output authentication information.

An output command is an instruction to output an image-attached report from image-attached report data which is stored in the storing section 31 in a predetermined method. When receiving an output command, this preferred embodiment print-outputs an image-attached report from the outputting section 24.

Further, the storing section 31 also has a function of confidential box 32 and a function of personal box 33.

Confidential box 32 is one of boxes which can store image data. Image processing apparatus contains multiple confidential boxes 32. Each confidential box 32 is assigned a confidential box name and a password which is information to authenticate accessing to the confidential box. Further, when a confidential box 32 is shared by multiple users, the information contains IDs of users that can access the confidential box.

Each confidential box 32 stores image data which was received from an external terminal by the facsimile function and print data used to print images by the printer function. When an image is print-output according to image data stored in a confidential box 32, the image data is deleted from the confidential box 32. Similarly, image data registered for each confidential box 32 contains the user ID of a user who made the job and discriminable index information such as print data and facsimile reception data.

Further, each confidential box 32 has a function to store image-attached report data. Image-attached report data is stores in confidential box 32 directly from generating section 30 or after it is stored in storing section 31. When image-attached report data is stored in confidential box 32 directly from generating section 30, the image-attached report data is not stored in storing section 31. When stored in confidential box 32 after being stored in the storing section 31, the image-attached report data is deleted from the storing section 31.

To take out an image-attached report from confidential box 32, it is necessary to authenticate an authority to access the confidential box 32 by using the access authentication information. For this purpose, this preferred embodiment does not assign output authentication information to the image-attached report data which is stored in confidential box 32. Only user identification information is assigned to the image-attached report data.

Personal box 33 is one of boxes which can store image data. The image processing apparatus contains multiple personal boxes 33. Each personal box 33 is assigned a personal box name and a password which is information to authenticate accessing to the personal box 33. Personal box 33 like confidential box 32 stores image data which was received by facsimile and image data to be printed by the printer function. However, while image data in confidential box 32 is deleted after it is print-output, image data in personal box 33 is not deleted after an image is print-output unless a Delete command is accepted.

Further, personal box 33 has a function to store image-attached report data. The image-attached report data to be stored in personal box 33 is generated by the generating section 30 and stored in the storing section 31 in the same manner as data to be stored in confidential box 32 and will not be explained here.

The user can output image-attached report data to a confidential box 32 or personal box 33 by specifying the destination box on a touch-sensitive panel (which is not shown in the figure) of displaying section 20. The touch-sensitive panel appears when a job starts.

Incidentally, although this preferred embodiment provides confidential boxes 32 and personal boxes 33 in predetermined areas on the same non-volatile memory as the memory for the storing section 31, they can be provided in the separate storage mediums.

CPU 11 functions as setting section 34, judging section 35, registering section 36, informing section 37, and receiving section 38.

Setting section 34 works to set a kind of transmission report to be print-output. For this purpose, setting section 34 has a function to switch to select an image-attached report or a no-image report according to a command from the user.

Further, setting section 34 has a function to switch to select a first mode which print-outputs an image-attached report only when an output command is accepted from the user while a setting is made to generate an image-attached report and a second mode print-outputs an image-attached report under a predetermined condition independently of whether an output command is accepted or not.

When the first mode is selected, the generated image-attached report data is stored in the storing section 31. When a confidential box 32 or personal box 33 is selected as a destination box at the start of a job, the image-attached report data is stored in the selected box.

When the second mode is selected, the image-attached report data is generated. The image-attached report is print-output from the outputting section 24, for example, immediately after generation if it satisfies a predetermined condition.

Similarly to print-outputting of an image-attached report in the second mode, a no-image report is print-output from the outputting section 24, for example, immediately after generation if it satisfies a predetermined condition.

A kind of transmission report to be generated and a mode of outputting an image-attached report are set by a setting command entered by the user from a touch-sensitive panel (which is not shown in the drawing) of the displaying section 20.

It is preferable to authenticate the authority of an administrator who changes modes (between first and second modes) to prevent involuntary change of modes.

This preferred embodiment is configured to select print-outputting of no-image reports or print-outputting of image-attached reports in advance. However, it is also possible to allow the user to select it when a job starts. Similarly, it is also possible to allow the user to select the first or second mode when a job starts.

"A predetermined condition" under which an image-attached report is print-output in the second mode is not limited to print-outputting immediately after generation of an image-attached report. For example, the condition can be to store a generated image-attached report data in the storing section 31 and print-output a report when the quantity of image-attached report data is almost reaching the storage capacity of the storing section 31, at predetermined time intervals, or when a predetermined number of jobs are executed. Further, the condition can be to print-output a report when a job error, for example, a failure of a job. These conditions can be set singly or in combination. Furthermore, it is possible to make alarms by specific display or lamps, voices, or others when the predetermined time or timing comes.

Judging section 35 judges the kind of transmission report data which was generated by the generating section 30. CPU 11 working as a controller has a function to determine a location storing transmission report data and a destination box to which transmission report data is output in accordance with the kind and the setting made by the setting section 34. The judging section 35 judges a report kind (with or without image information to be print-output by information about the setting obtained from the setting section 34.

When the judging section 35 judges the generated data as no-image report data, CPU 11 as the controller controls outputting of report data when the data satisfies the predetermined condition. For example, the controller works to instruct the generating section 30 to output no-image report data to the outputting section 24 immediately after the report data is generated.

When the judging section 35 judges the generated data as image-attached report data, CPU 11 as the controller works to select destinations to which the generating section 30 outputs the image-attached report data according to the mode setting (first or second mode).

When the first mode is selected, CPU 11 informs the generating section 30 of a destination in the storing section 31 in which the image-attached report data is stored.

When accepting a setting of a location to store the image-attached report data from the user at the start of a job, CPU 11 makes an output command to output the image-attached report data to a selected confidential box 32 or personal box 33.

When the second mode is selected, CPU 11 makes an output command to output the image-attached report data to the outputting section 24.

Registering section 36 has a function to associate image-attached report data with user identification information and output authentication information for registration before the data is stored in the storing section 31. For this relationship and registration, the registering section 36 acquires a user ID and a password which were entered by the user from RAM 13 and records them in the header field of the image-attached report data. The header field of the image-attached report data can also contain date and time of a transmission end.

Further, the registering section 36 has a function to relate image-attached report data to user identification information for registration when the image-attached report data is stored in a confidential box 32 or personal box 33. A kind of information to be registered to the image-attached report data and a method of generation of the data by the generating section 30 are the same as those of the storing section 31 except that the output authentication information is not registered and that information indicating "image-attached report" is added to enable discrimination from the other image data. Therefore, they will not be explained here.

Besides, the registering section 36 also has a function to register user identification information and other information to print data and facsimile reception data which are stored in a confidential box 32 or personal box 33. Information to be registered for these pieces of image data contains such information that indicates "Print data" and "Received by facsimile" to enable easy discrimination of a kind of job which is related to the image data A method of entering user identification information and output authentication information to be registered to the image-attached report data is not limited to a method of entering them when the user starts to use image processing apparatus 10. It is possible to enter them when a transmission job starts. It is also possible to read information from a user-specific authentication card or the like by a predetermined reader. Additionally, any timing and methods can be used to enter these kinds of information.

Further, the technique to associate the image-attached report data with user identification information and output authentication information for registration is not limited to the above example, either. For example, it is possible to generate report identification information for discrimination of each image-attached report data and relate this kind information to user identification information for management. Further it is possible to use any other method.

Informing section 37 has a function to inform that image-attached report data is waiting in the storing section 31. When the judging section 35 judges that image-attached report data is generated by the generating section 30 or when the controller (CPU 11) detects that image-attached report data is in the storing section 31, the informing section 37 works to display an associated alerting icon on a predetermined screen of the displaying section 20.

Incidentally, a method of informing that an image-attached report is waiting to be output is not limited to a method of displaying an associated alerting icon on screen. For example, the existence of a waiting report can be informed by any other informing unit than voices and the displaying section 20 such as an LED (Light Emitting Diode) indicator, a predetermined alerting mail addressed to the user, printing out the message on recording paper.

Also when image-attached report data is stored in a confidential box 32 or personal box 33, the informing section can be so constructed as to indicate a box which contains image-attached report data.

Receiving section 38 has a function which receives a command to output an image-attached report of specific image-attached report data stored in the storing section 31 from the user through a touch-sensitive panel of the operating section 21.

Receiving section 38 also has a function to check whether the user who entered an output command has an authority to submit a command to output the image-attached report before accepting the command.

Further, the receiving section 38 also has a function to display a list of index information associated with image-attached report data which is stored in the storing section 31. Index information is a key to get to specified image-attached report data. This preferred embodiment uses, as the index information, user IDs and transmission end dates/times.

The receiving section 38 also has a function to select image-attached report data associated with a specified user ID among image-attached report data in the storing section 31 and display its index information on the displaying section 20.

The receiving section 38 has two methods to accept an output command: first method of accepting the selection of an image-attached report from the user and print-outputting thereof and second method of accepting the input of user identification information from the user, selecting and displaying index information of an image-attached report associated with the user identification information, and accepting an output command.

In the first method of accepting an output command, the displaying section 20 displays a list of index information associated with all image-attached report data in the storing section 31. The user selects a desired image-attached report on the touch-sensitive panel of the displaying section 20, and enters an output command. Next, when the user enters output authentication information if necessary, the controller compares the information by information recorded in the header field of each image-attached report. When these kinds of information match each other, the controller accepts the output command of the selected image-attached report, or authenticates the authority of the user, and print-outputs the image-attached report from the outputting section 24.

Meanwhile, when an output command is accepted in the second method, the user enters user identification information and output authentication information. When the entered user identification information matches the user identification information in the header field, the selecting/displaying section 38 displays index information about image-attached report data associated with the authenticated image-attached report if necessary. When the user selects image-attached reports associated with the selected and displayed index information and enters a command to output them, the selected image-attached reports are print-output.

The receiving section 38 also has a function to check whether or not the user has an authority to access confidential boxes 32 and personal boxes 33.

Figure 2:
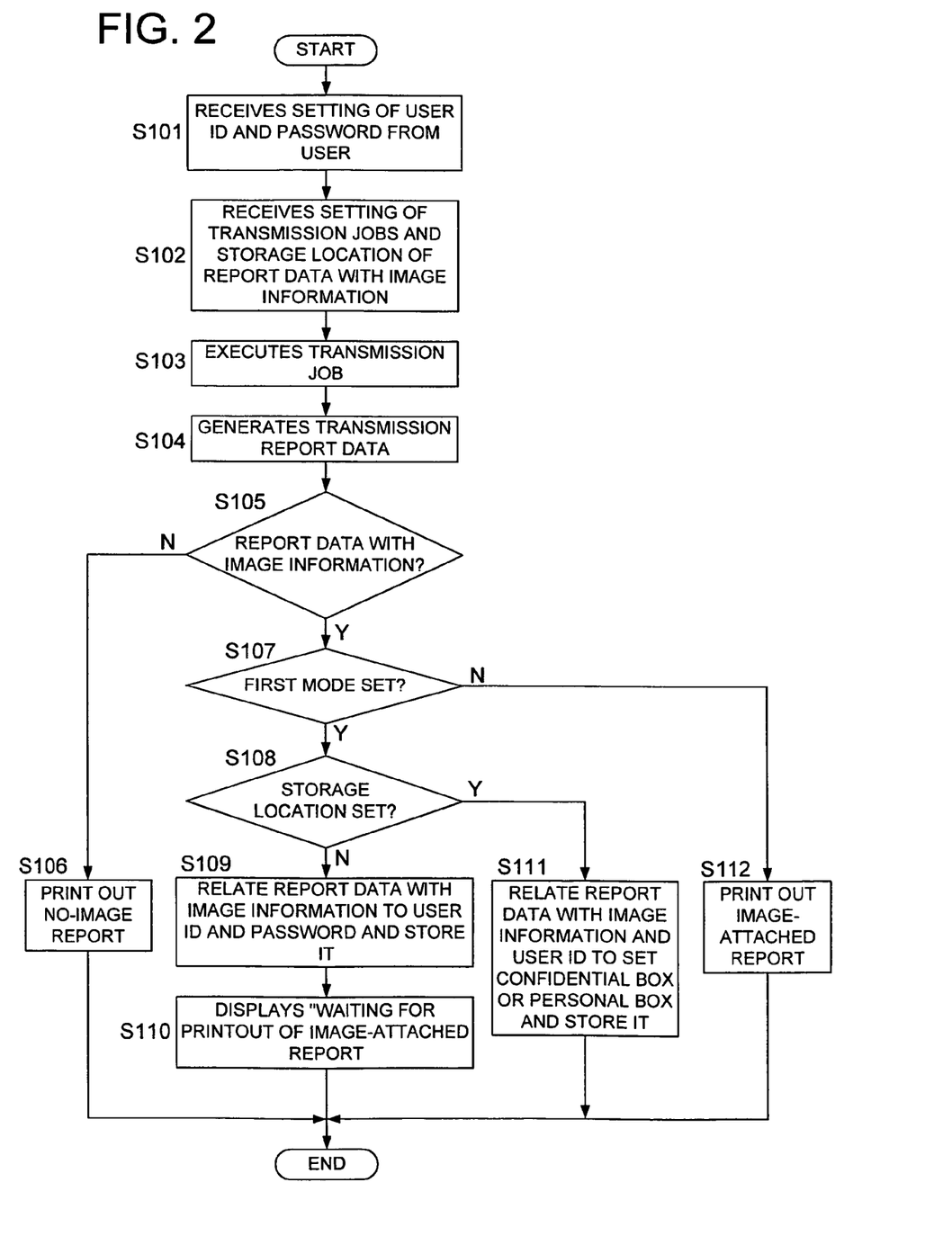
FIG. 2 shows a flow of operation of an image processing apparatus to generate a transmission report on a transmission job.

FIG. 2 shows a flow of operation of image processing apparatus 10 to generate a transmission report on a transmission job.

When first accepting a user ID and password from a user (Step S101) and then a setting such as a transmission job and a storage location of image-attached report data (Step S102), image processing apparatus 10 executes the transmission job (Step S103).

Next, image processing apparatus 10 generates transmission report data (Step S104) and checks the setting to see whether or not the generated transmission report data is image-attached report data (Step S105). When it is not image-attached report data ("N" at Step S105), image processing apparatus 10 print-outputs a no-image report when a predetermined condition is satisfied, for example, when report data is generated. Then image processing apparatus 10 ends (End).

When image-attached report data is generated ("Y" at Step S105), image processing apparatus 10 checks the output mode setting (Step S107). When the first mode is not set ("N" at Step S107), image processing apparatus 10 print-outputs an image-attached (Step S112) and ends the operation. (End)

When the first mode is set ("Y" at Step S107), image processing apparatus 10 checks whether a storage location of image-attached report data has been specified (Step S108). When a storage location is specified ("Y" at Step S108), image processing apparatus 10 stores the image-attached report data in a confidential box 32 or personal box 33 in association with the user ID (Step S111) and ends the operation. (End)

When the storage location of the image-attached report is not set ("N" at Step S108), image processing apparatus 10 stores image-attached report data in the storing section 31 in association with the user ID and password, displays "Image-attached report waiting to be output" (Step S110), and ends the operation. (End)

When an image-attached report is waiting to be output, the waiting status is displayed on the displaying section 20 so that the user may recognize it. This can prevent the user from going without knowing that an image-attached report remains un-output, that is, from failing in knowing the processing status of a transmission job.

Further, image processing apparatus 10 automatically checks a kind of a generated report (image-attached report or no-image report) and stores only an image-attached report in the storing section 31, a confidential box 32 and so on. Therefore, images attached to the image-attached report can be made secret before the user judges the type of each transmission report. Further, when it is judged that a no-image report is generated, its report is directly print-output. Therefore, when non-confidential reports are made, the user can check the job processing status with out consuming time and labor for assurance of secret management.

Various conditions can be set adequately according to user's demands since image processing apparatus 10 can change modes between the first mode which keeps image-attached reports in the storing section 31, etc. until an output command is accepted and the second mode which print-outputs image-attached reports when a predetermined condition is satisfied regardless of the existence of an output command.

The predetermined condition of the second mode is not limited to that of this preferred embodiment. When the condition is variable, the mode operation can be flexible. For example, it can be so designed as to essentially store image-attached report data in the storing section 31 and print-output image-attached reports in unavoidable circumstances such as when the whole memory of the storing section 31 is occupied or at preset time instants at which the administrator of image processing apparatus 10 can confirm. This does not require manual input of output commands by the user and prevent lot of image-attached report data from storing in the storing section 31.

Further, since image-attached report data can be stored in confidential boxes 32 and personal boxes 33, the quantity of memory spaces shared by all users can be reduced in the storing section 31. Further, unique passwords are associated with these boxes in advance and controlled automatically. So the users need not specify their passwords.

Figure 3:
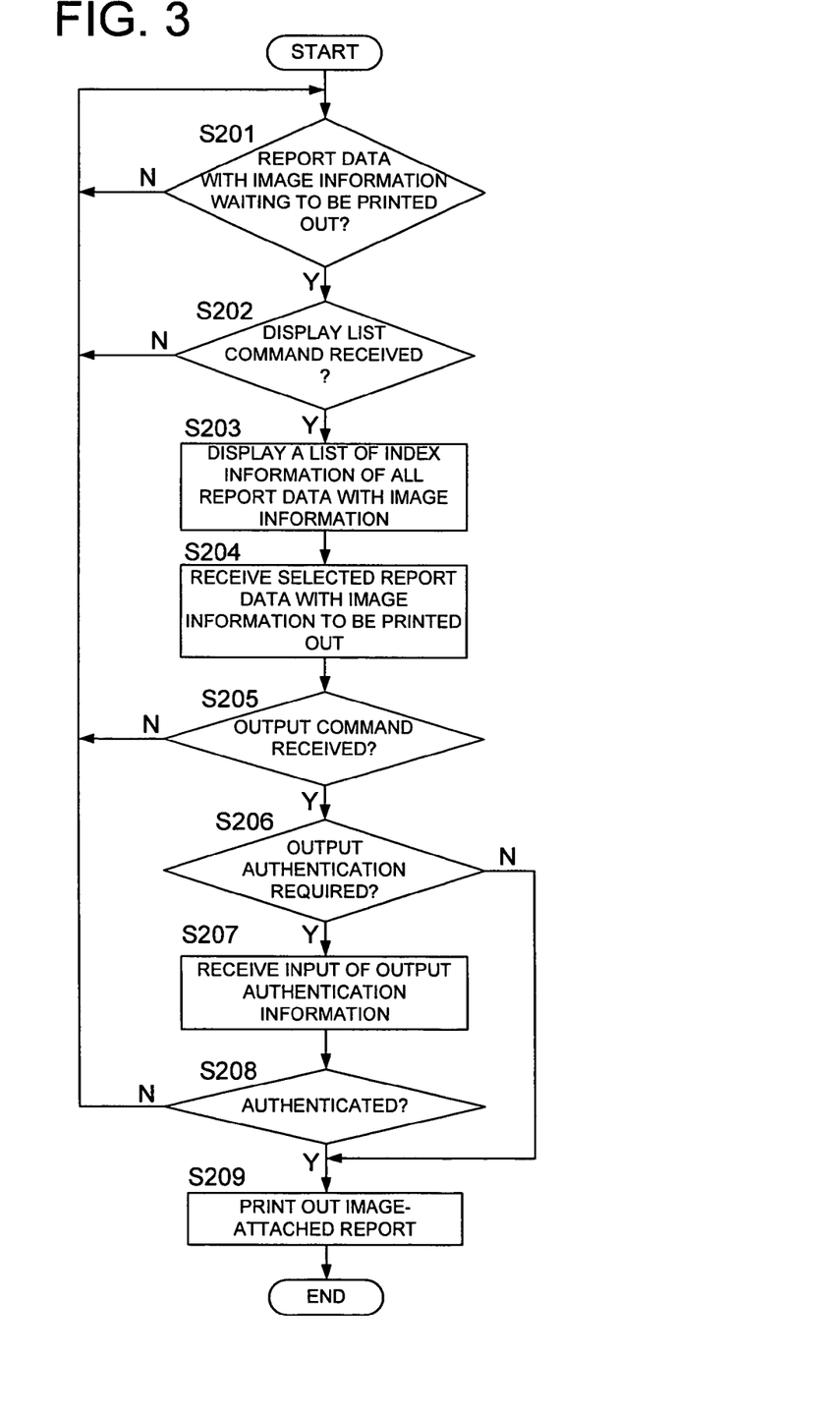
FIG. 3 shows a flow of operation to print-output an image-attached report in a first method in which the user selects an image-attached report and enters an output command.

FIG. 3 shows a flow of operation to print-output an image-attached report in the first method in which the user selects the image-attached report and enters an output command.

First, image processing apparatus 10 checks whether or not a piece of image-attached report data is waiting to be output (Step S201). When finding no waiting image-attached report ("N" at Step S201), image processing apparatus 10 keeps on checking. When finding a waiting image-attached report ("Y" at Step S201), image processing apparatus 10 waits until a List Display command is accepted. ("N" at Step S202 and "Y" at Step S201)

When a List Display command is accepted from the user ("Y" at Step S202), image processing apparatus 10 displays a list of index information of all image-attached report data that are waiting to be output (Step S203), accepts a selection of an image-attached report to be print-output, and checks whether a command is accepted to output the report (Step S205).

When an Output command is not accepted for a predetermined time period or because of input of a Cancel command ("N" at Step S205), image processing apparatus 10 returns to the first step (Step S201) and waits.

Contrarily, when accepting a command to output an image-attached report ("Y" at Step S205), image processing apparatus 10 checks whether or not the report requires an authentication to print-output (Step S206). When no authentication is required ("N" at Step S206), image processing apparatus 10 print-outputs the image-attached report (Step S209), and ends the operation which print-outputs an image-attached report in the first method. (End)

When an authentication is required ("Y" at Step S206), image processing apparatus 10 accepts an input of a user password (Step S207). If the authentication is invalid because of an invalid password ("N" at Step S208), image processing apparatus 10 returns to the first step (Step S201) and waits. When the authentication is valid ("Y" at Step S208), image processing apparatus 10 print-outputs the image-attached report and ends the operation which print-outputs an image-attached report in the first method. (End)

In this way, the image-attached report is not print-output until an Output command is accepted. Therefore, the image-attached report is in no danger of being overseen by third persons and the secret protection of the report is assured. Further since an authentication is made when an Output command is accepted, it will never occurs that an unauthorized user has a chance to print-output an image-attached report without authority. The secrecy of the confidential information can be improved.

In the above description, the case that an image-attached report is print-output in accordance with the input of an Output command is explained. However, it is possible to display-output the image-attached report, for example, to the displaying section 20. Further it is possible to selectively print-output only necessary image-attached reports on recording paper and delete the other unwanted image-attached reports from the storing section 31. This can save recording paper and toner.

Additionally, it is possible to selectively output image-attached report data from the storing section 31 to confidential box 32 or personal box 33 and print-output it in the future. Further, it is possible to output image-attached report data by e-mails or FTP (File Transfer Protocol) to external terminals which are connected to image processing apparatus 10 through a network. In this way, any output technology can be used as long as an authorized user can confirm the content of image-attached report data.

Figure 4:
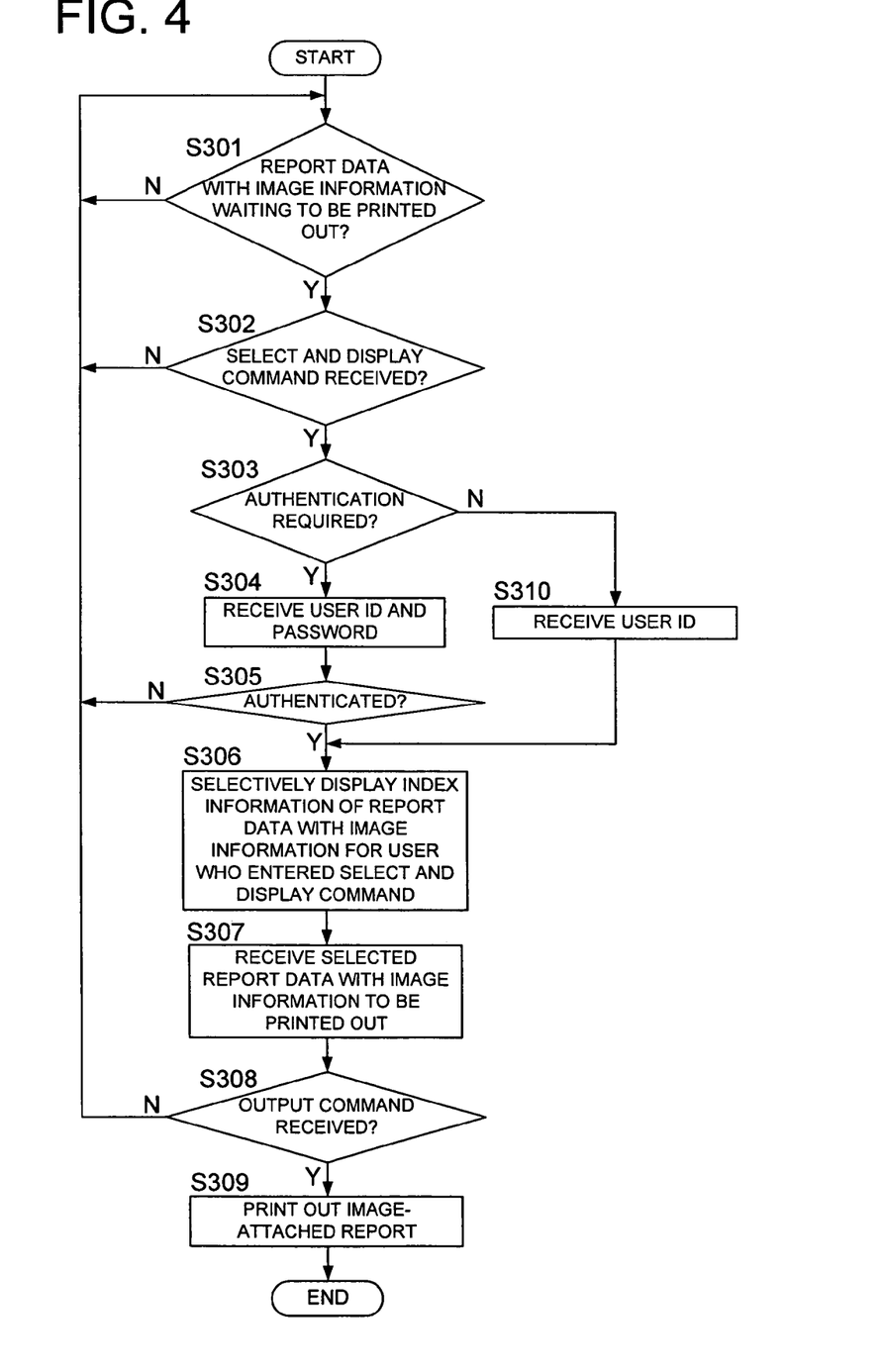
FIG. 4 shows a flow of operation to print-output an image-attached report in a second method in which the user selects an image-attached report on a displaying section and enters a command to output the report.

FIG. 4 shows a flow of operation to print-output an image-attached report in the second method in which the user selects the image-attached report on the displaying section and enters a command to output the report.

First, image processing apparatus 10 checks whether or not a piece of image-attached report data is waiting to be output (Step S301). When finding no waiting image-attached report ("N" at Step S301), image processing apparatus 10 keeps on checking. When finding a waiting image-attached report ("Y" at Step S301), image processing apparatus 10 waits until a Select and Display command is accepted. ("N" at Step S302 and "Y" at Step S301)

When a Select and Display command is accepted from the user ("Y" at Step S302), image processing apparatus 10 checks whether or not authentication is required (Step S303). When authentication is not required ("N" at Step S303), image processing apparatus 10 accepts only the output of a user ID from the user (Step S310) and goes to a step (Step S306) to selectively display index information associated with the image-attached report corresponding to the user ID.

When an authentication is required ("Y" at Step S303), image processing apparatus 10 accepts an input of user ID and password (Step S304). If the authentication is invalid because of an invalid password ("N" at Step S305), image processing apparatus 10 returns to the first step (Step S301) and waits. When the authentication is valid ("Y" at Step S307), image processing apparatus 10 selectively displays index information of image-attached report data associated with the entered user ID (Step S306).

Then, image processing apparatus 10 accepts the selection of an image-attached report to be print-output (Step S307) and checks for a command to output the image-attached report (Step S308). When an Output command is not accepted for a predetermined time period or because of input of a Cancel command ("N" at Step S308), image processing apparatus 10 returns to the first step (Step S301) and waits.

Contrarily, when accepting a command to output an image-attached report ("Y" at Step S308), image processing apparatus 10 print-outputs the image-attached report (Step S309), and ends the operation (which print-outputs an image-attached report in the second method). (End)

As described above, the user can easily look for index information about his/her job in the storing section 31) which is shared by multiple users since the index information displayed are related to user IDs as identification information. If all selectively-displayed image-attached report data in a list is print-outputted together based on Select All command, this can greatly save the user's labor.

Image-attached data is print-outputted after authentication similarly to the first method. So just by assigning unique passwords to respective pieces of output-authentication information, the image-attached report is in no danger of being print-output by third persons and the secret protection of the report is assured.

Figure 5:
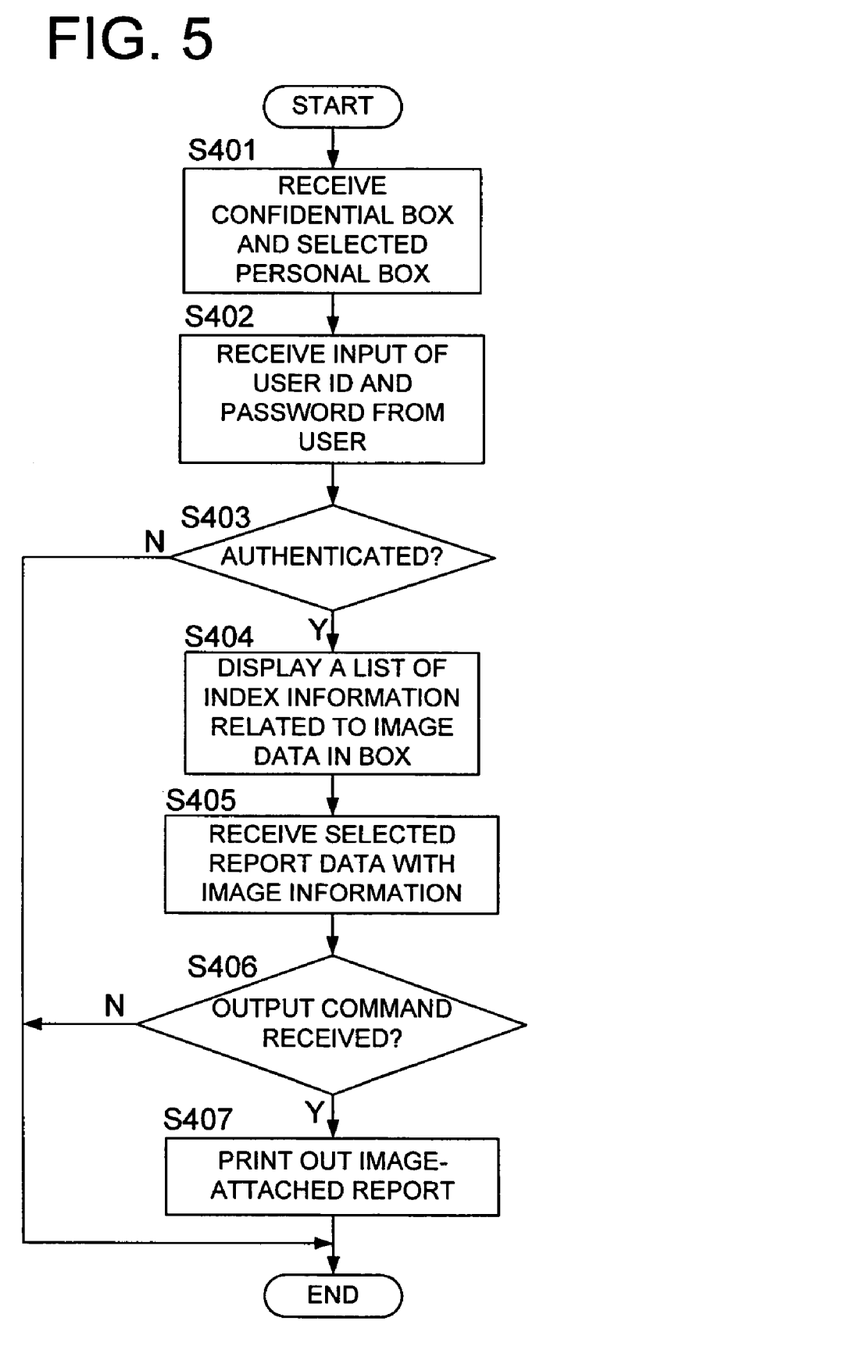
FIG. 5 shows a flow of operation to output an image-attached report data to print from confidential box 32 and personal box 33.

FIG. 5 shows a flow of operation to output image-attached report data to print from confidential box 32 and personal box 33.

First, when the user selects a confidential box 32 or personal box 33 by entering its box number, box icon, or the like (Step S401), image processing apparatus 10 accepts the user ID and password which are assigned to the box in advance (Step S402).

When the authentication is not done because the entered user password is invalid or the like ("N" at Step S403), image processing apparatus 10 ends the operation immediately. (End) Contrarily, when the authentication is made ("Y" at Step S403), image processing apparatus 10 displays a list of index information related to image data in the confidential box 32 or personal box 33 (Step S404).

Next, image processing apparatus 10 accepts the selection of an image-attached report to be print-output (Step S405) and checks for a command to output the image-attached report. When an Output command is not accepted for a predetermined time period or because of input of a Cancel command ("N" at Step S406), image processing apparatus 10 ends the operation immediately. (End)

When accepting a command to output the image-attached report (Step S406; Y), image processing apparatus 10 print-outputs the selected image-attached report (Step S407) and ends the operation. (End)

Since confidential boxes 32 and personal boxes 33 are respectively assigned a unique password, the image-attached report data in each box is in no danger of being print-output by third persons.

In the above description, an authentication to access each box (confidential box 32 or personal box 33 are required. However, the authentication is not always required.

Figure 6:
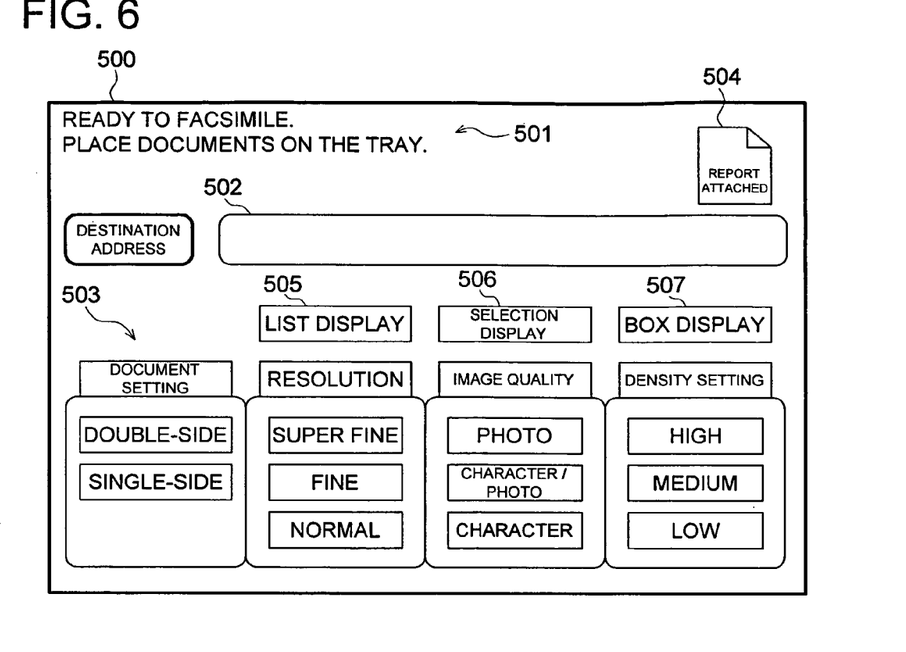
FIG. 6 shows an example of a basic screen for a facsimile function of an image processing apparatus embodied in the present invention.

FIG. 6 shows an example of basic screen 500 for a facsimile function of image processing apparatus 10.

Basic screen 500 contains message display field 501 for a guidance of an executable job, facsimile number entry field 502 in which a destination facsimile number is entered, detailed setting field 503 for various kinds of setting, icon 504 to inform of data availability, Display List button 505, Selection Display button 506, and Display Box button 507.

Icon 504 informs that the storing section 31 keeps image-attached report data which is waiting to be output. This icon 504 is invisible when the storing section 31 keeps no image-attached report data waiting to be output.

Display List button 505 is a touch-sensitive panel button to submit a List Display command to display a list of index information about all image-attached report data that are kept in the storing section 31. When this button 505 is pressed, the List Display screen appears.

Selection Display button 506 is a touch-sensitive panel button to selectively display index information associated with image-attached reports which are assigned specific user identification information among image-attached report data stored in the storing section 31. When this button 506 is pressed, the authentication window appears on demand before the Selection Display screen.

Display Box button 507 is a touch-sensitive panel button to display a screen for selection of storing section 31 and confidential box 32.

Figure 7:
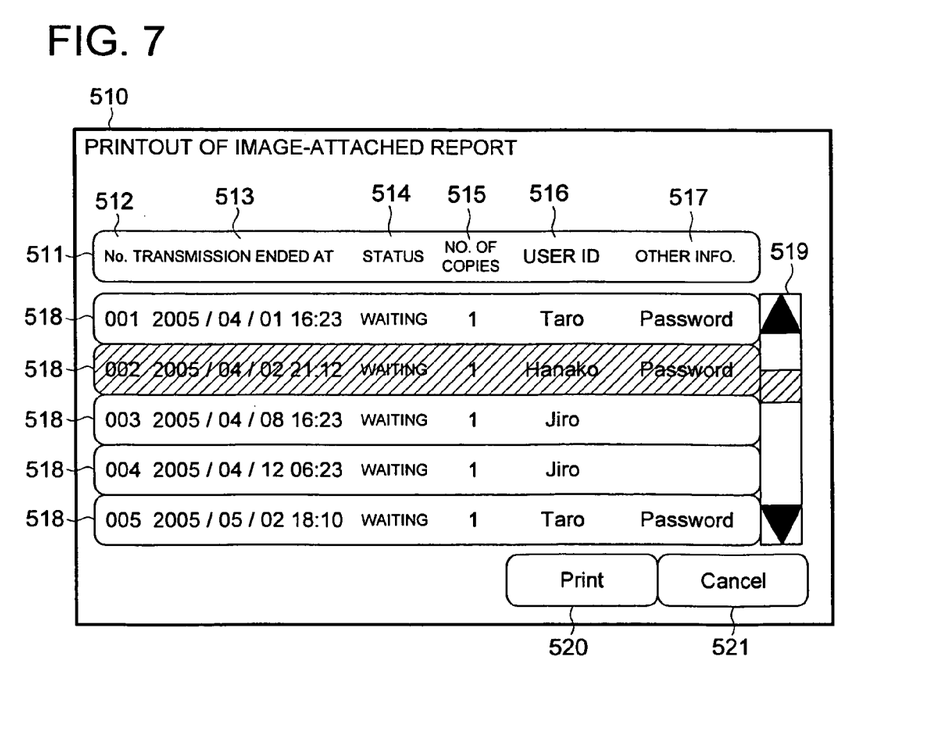
FIG. 7 shows an example of a List Display screen, which displays a list of index information about all image-attached report data.

FIG. 7 shows an example of List Display screen 510 which displays a list of index information about all image-attached report data that are waiting to be output. The List Display screen 510 is displayed when the Display List button 505 is pressed on basic screen 500.

List display screen 510 contains guidance display field 511, multiple list display fields 518, scroll bar 519, Print button 520, and Cancel button 521.

Guidance display field 511 displays a guidance of the content of the index information on screen. Items in the field 511 are Transmission end date/time 513, Status 514, No. of pages 515, User ID 516, and Other information 517. These items 512 to 517 are for the content of each line of information in the list display field 518 under the items 512 to 517.

Under the No. field 512 are listed management serial numbers for image-attached report data kept in the storing section 31 in the ascending order of transmission end dates/times. Under the Transmission end date/time 513 is listed the date and time of the end of each transmission job. Under the Status field 514 is listed the status of each image-attached report to indicate whether the report is "Waiting" to be output. Under the NO. of pages field 515 is listed the number of output pages of each image-attached report. Under the User ID field 516 are listed user IDs. Under the Other information field 517 are listed symbols "Password" for image-attached reports when passwords are required to accept an Output command.

Each list display field 518 shows index information about each piece of image-attached report data kept in the storing section 31. The index information in each list display field 518 contains data for items 512 to 517 of the guidance display field 511 in sequence from left to right. When the user selects an image-attached report that the user wants to print-output and press its list display field 518 on the touch-sensitive panel, the selected display field 518 is highlighted (as seen on the second list display line) to see that the selection is accepted. In this case, one or more list display fields 518 can be selected.

Scroll bar 519 is used to scroll down or up to see the list display fields 518 that exceed the screen.

The Print button 520 is used to submit a command to output a selected image-attached report. When the Print button 520 is pressed, a window appears to enter a user ID and a password. The Cancel button 521 is used to cancel print-outputting of a selected image-attached report. When the Cancel button 521 is pressed, the selected image-attached report is not print-output and basic screen 500 returns.

Figure 8:
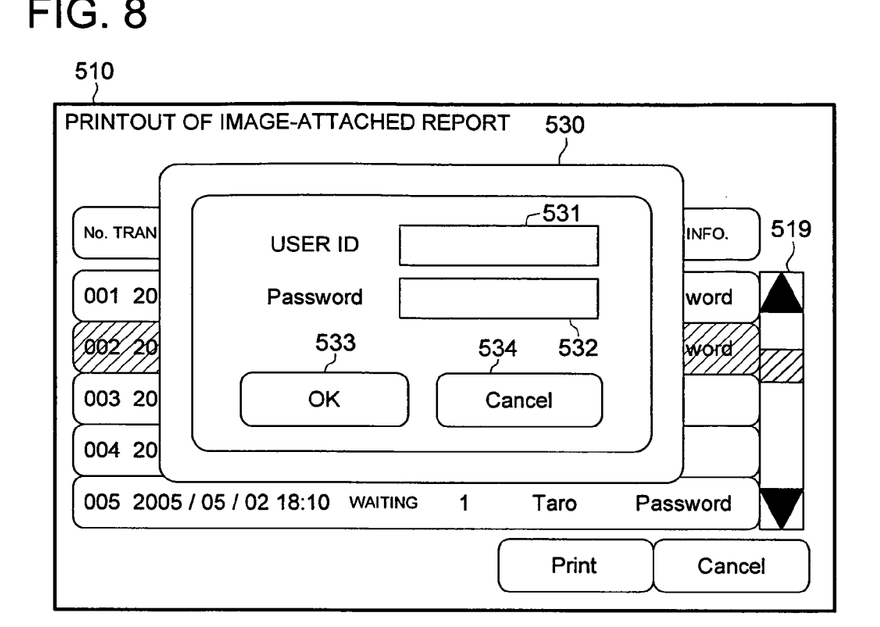
FIG. 8 shows an example of an authentication window, which appears when an output command is accepted in a first method.

FIG. 8 shows an example of authentication window 530 which appears when an output command is accepted in the first method. This window 530 appears before the List display screen 510 when the Print button 520 is pressed.

The authentication window 530 contains user ID entry field 531 to type in a user ID, password entry field 532 to type in a password if it is required, OK button 533 to execute authentication, and Cancel button 534 to cancel authentication.

The user enters a user ID in the user ID entry field 531 and a password (when required) in the password entry field 532 and then presses the OK button 533. When the authentication is complete, the selected image-attached report corresponding to a highlighted list display field 518 on the List Display screen 510 is print-output. When the Cancel button 534 is pressed, the authentication window 530 closes and the List Display screen 510 returns.

Figure 9:
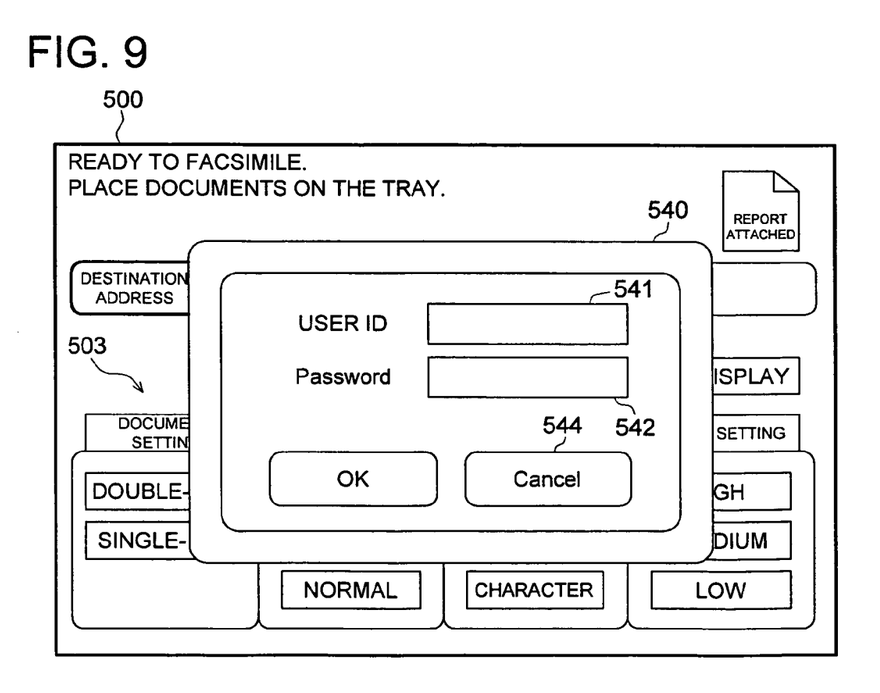
FIG. 9 shows an example of an authentication window, which appears when an output command is accepted in a second method.

FIG. 9 shows an example of authentication window 540 which appears when an output command is accepted in the second method. This window 540 appears before the basic screen 500 when the Selection Display button 506 is pressed on the basic screen 500. The configuration of the authentication window 540 in the second method is the same as that of the authentication window 530 which appears when an output command is accepted in the first method.

The user enters a user ID in the user ID entry field 541 and a password (when required) in the password entry field 542 and then press the OK button 543. The Selection Display screen appears. When the Cancel button 544 is pressed, the authentication window 540 closes and the basic screen 500 returns.

Figure 10:
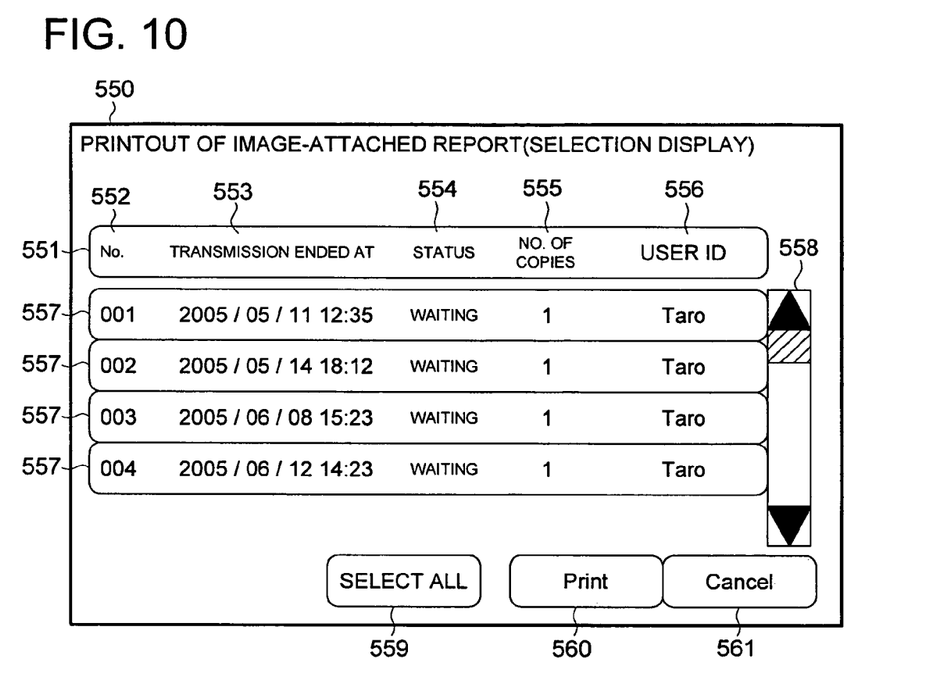
FIG. 10 shows an example of a Selection Display screen, which displays index information associated with image-attached report data of the authenticated user.

FIG. 10 shows an example of Selection Display screen 550 which displays index information associated with image-attached report data of the authenticated user. This screen 550 appears when the user enters required information and press the OK button 543 on the authentication window 540.

The Selection Display screen 550 contains guidance display field 551, multiple selection display fields 557, scroll bar 558, Select All button 559, Print button 560, and Cancel button 561. Guidance display field 551 contains No. field 552, Transmission end date/time field 553, Status field 554, No. of pages field 555, and User ID field 556.

The configuration and function of the Selection Display screen 550 are almost the same as those of the List display screen 510 (see FIG. 7) except for that the Selection Display field 557 displays index information off only image-attached reports associated with the authorized user, that the "Other information" field for "Password" is not shown since the user is already authenticated, and that the Select All button 559 is provided to select all Selection Display fields 557.

When the user selects a specific selection display field 557 or press the Select All button 559 and then press the Print button 560, the selected image-attached report (or all image-attached reports) is print-output. When the user presses the Cancel button 561, the basic screen 500 returns.

Figure 11:
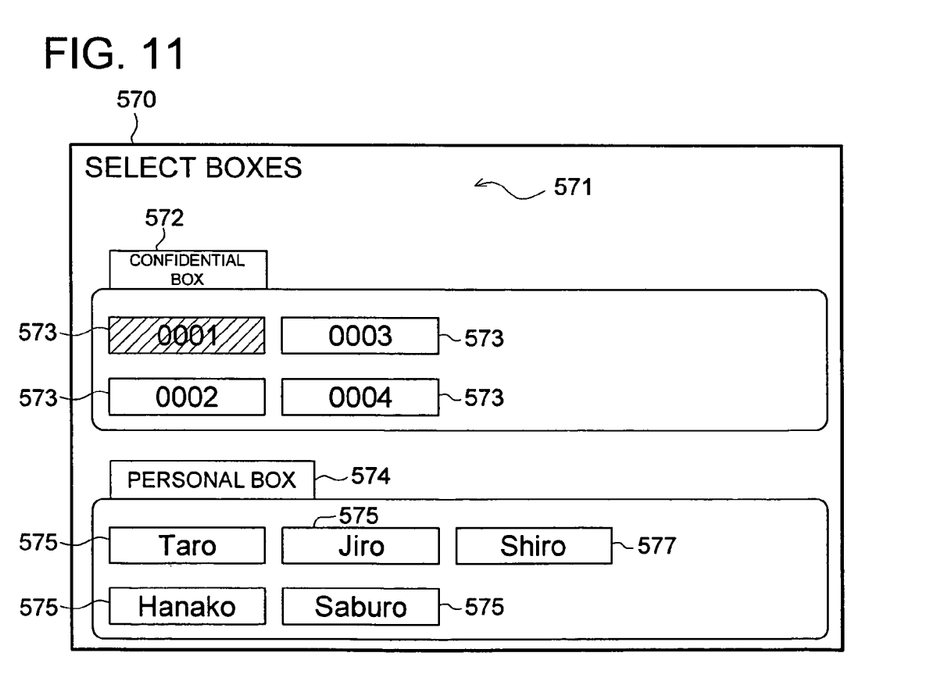
FIG. 11 shows a Box Selection screen to select a confidential box and a personal box.

FIG. 11 shows a Box Selection screen 570 to select confidential box 32 and personal box 33. This screen 570 appears when the Display Box button 507 is pressed on the basic screen 500.

Box selection screen 570 contains guidance message field 571 which shows an operation guidance, Confidential box display field 572 which shows available confidential boxes, and personal box display field 574 which shows available personal boxes. The confidential box display field 572 shows a list of named confidential box buttons 573 for selection. Similarly, the personal box display field 574 shows a list of named personal box buttons 575 for selection.

When the user selects a confidential box (in the confidential box selection field) or a personal box (in the personal box selection field) and press its button 573 or 575, a window appears to enter access-authentication information.

Figure 12:
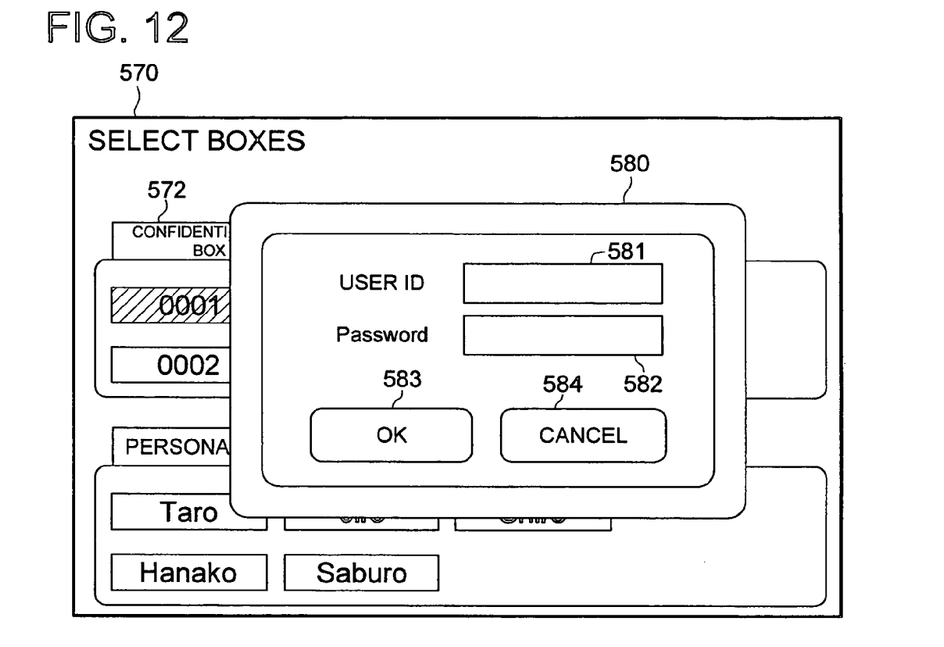
FIG. 12 shows an example of an authentication window, which appears when a confidential box or a personal box is used.

FIG. 12 shows an example of authentication window 580 which appears when confidential box 32 or personal box 33 is used. The authentication window 580 of FIG. 12 is the same as the authentication window 530 of FIG. 8. When the user enters a user ID in the User ID entry field 581 and a password in the Password entry field 582 and press the OK button 583, a box screen appears to display the content of the authenticated confidential box 32 or personal box 33. When the user presses the Cancel button 584, the Box Selection screen 570 returns.

Figure 13:
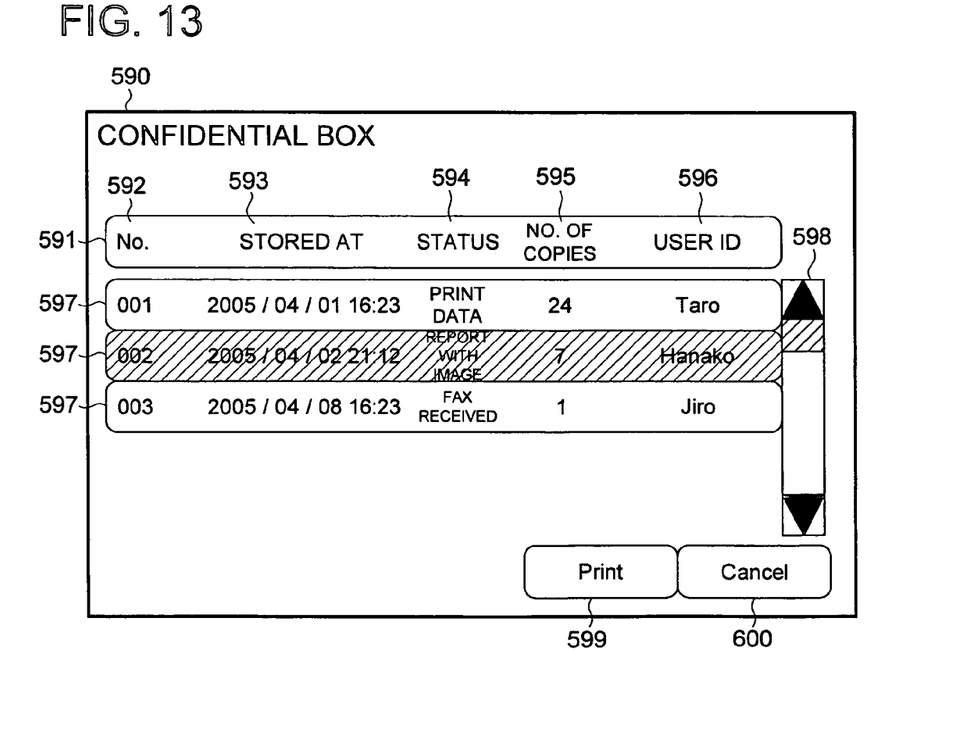
FIG. 13 shows an example of a box screen, which shows index information associated with image data stored in a confidential box and a personal box.

FIG. 13 shows an example of box screen 590 which shows index information associated with image data stored in confidential box 32 and personal box 33. As a representative example, FIG. 13 shows a box screen 590 for confidential boxes 32. The box screen 590 appears after the user enters required information and presses the OK button 583 on the authentication window 580.

The box screen 590 contains guidance field 591, multiple storage data display fields 597, scroll bar 598, Print button 599, and Cancel button 600. The guidance display field 591 contains No. field 592, Date of Saving field 593, Status field 594, No. of pages field 595, and User ID field 596.

The configuration and function of the box screen 590 are almost the same as List Display screen 510 (see FIG. 7) except for that storage data display field 597 contains index information associated with various kinds of image data stored in confidential box 32 besides image-attached report data and that the "Other information" field for "Password" is not shown since the user is already authenticated, The preferred embodiment of this invention has been described above in reference to accompanying drawings. However, the substantial structure of this invention is not limited to the preferred embodiment. Variations and additions may be made by one skilled in the art without departing from the spirit and scope of this invention.

For example, this preferred embodiment uses non-volatile memory as a storage medium which constitutes the storing section 31. However, the storage medium is not limited to this. Any storage medium such as HDD (short for hard disk drive) or optical disk can be used. Further, it can be an external storage medium.

Further, image-attached reports need not be stored in an image data format in the storing section 31. For example, it is possible to relate data indicating job processing state to image data to be processed, store status data and image data separately, and create image data of the output format when an image-attached report is output. With this configuration, it is possible to display only status data (indicating the job processing status) on the displaying section 20 for confirmation of the content of report, print-output image-attached reports only when they are required, and delete unwanted image-attached reports directly.

Further in the above description, the preferred embodiment of image processing apparatus 10 print-outputs two kinds of transmission reports (image-attached reports and no-image reports). However, the image processing apparatus 10 can print-output only image-attached report data.

Further, data to be output as image-attached reports is not limited to information which indicates the processing status of a transmission job. It can be a reception report of an image data reception job. Furthermore, it can generally be reports which indicate various jobs that the image processing apparatus can execute such as document image scanning, printing, scan-to-email, Internet facsimile, etc. Any kinds of jobs can be output as image-attached reports.

Further, an image attached to an image-attached report is not limited to the first page. All pages or a predetermined number of pages can be attached to the image-attached report. Furthermore, it is possible to attach part of image on the first page (i.e. a leading few centimeters of the page) to the report. In this case, the image can have any image format.

Further, the preferred embodiment generates a report for each job. However, it is possible to attach images of multiple jobs to a job history which is a summary of processing states of the jobs.

Further, a technique by which the judging section 35 judges the kind of a generated transmission report is not limited to a technique to acquire the setting of a kind (report with or without image) from the setting section 34. For example, the kind of a report can be judged form the size of generated transmission report data. Furthermore, it is possible to judge the generation of image-attached report by detecting acquisition of image data from RAM 13 for generation of image-attached report data by the generating section 30. Any technique can be used to judge a report kind.

Further, a password to check whether the user has an authority to submit a command to output an image-attached report is not limited to the case that the user enters an arbitrary character string when starting to use the image processing apparatus. For example, it is possible to share passwords assigned to respective users according to authorities to use functions of the image processing apparatus (e.g. to use the color copy function of the apparatus).

Furthermore, this preferred embodiment is so constructed as to store only image-attached reports in the storing section 31. However, it is possible to store both image-attached reports and no-image reports in the storing section 31 and output them in response to output commands from the user. In short, confidential reports are output only by output commands from users. The first mode to attain it in the above description is detecting the existence of a specific confidential report and allowing a user who recognized the existence of the report to submit a command to output the report. The second mode is temporarily storing a specific confidential report in a storage medium to prevent the report from being output automatically. The third mode is outputting reports only when the user made a setting to enable automatic outputting of reports (by a Select All output command). However, this invention is not limited to these modes.

According to the image forming apparatus embodied in the present invention, since only the report with image information, the output instruction for which is accepted, is outputted, it becomes possible to prevent the report with image information from the information leakage due to the automatic outputting operation preformed during absence of the user. Further, since the user can output the report with image information at any time as needed, it becomes possible to maintain the merits of the report with image information while preventing the leakage of the secrecy.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus, comprising:
a job-status report generating section to generate an image-attached job-status report, which indicates a current processing status of a job and which has an image attached thereto, wherein the attached image includes image information regarding the job, and wherein the image-attached job status report contains information identifying an authorized user;
a storage section to store the image-attached job-status report generated by the job-status report generating section;
an instruction-accepting section to accept an output instruction for implementing an operation for outputting the image-attached job-status report stored in the storage section, only if the output instruction is inputted via the instruction-accepting section by the authorized user identified in the image-attached job-status report; and
an outputting section to print the image-attached job-status report onto a paper sheet and to output the paper sheet on which the image-attached job status report is printed, in response to the output instruction accepted by the instruction-accepting section from the authorized user identified in the image-attached job-status report;
wherein, with respect to a plurality of jobs inputted by a plurality of authorized users, the job-status report generating section generates respective image-attached job-status reports for every one of the plurality of jobs, and each of the image-attached job-status reports contains information identifying a respective authorized user who is authorized with respect to the job whose status is indicated by the image-attached job status report, such that each of the image-attached job status reports can only be outputted in response to an output instruction accepted by the instruction-accepting section from the respective authorized user identified in the image-attached job-status report.

2. The image processing apparatus of claim 1, further comprising:
a message notification section to notify the authorized user that the image-attached job-status report is generated by the job-status report generating section, when the image-attached job-status report is generated.

3. The image processing apparatus of claim 1, wherein the image-attached job-status report is stored in the storage section in correlation with identification information of the authorized user; and
wherein the identification information of the authorized user is designated via the instruction-accepting section so as to display index information regarding the image-attached job-status report correlated with the identification information of the authorized user, wherein the image-attached job-status report correlated with the identification information of the authorized user is selected from a plurality of image-attached job-status reports which have respective images attached thereto and are currently stored in the storage section.

4. The image processing apparatus of claim 3, wherein the outputting section prints the image-attached job-status report corresponding to the selected and displayed index information onto the paper sheet.

5. The image processing apparatus of claim 1, wherein the storage section is a box capable of storing image data.

6. The image processing apparatus of claim 5, wherein before a user is permitted to access the image data stored in the storage section, the user is required to authenticate that the user has authority to access the image data.

7. The image processing apparatus of claim 1, wherein, when accepting the output instruction for implementing the operation for outputting the image-attached job-status report, the instruction-accepting section authenticates that the authorized user has authority to issue the output instruction.

8. The image processing apparatus of claim 1, further comprising:
a setting section to set either a first mode in which the image-attached job-status report is outputted only when the instruction-accepting section accepts the output instruction, or a second mode in which the image-attached job-status report is outputted irrespective of presence or absence of the output instruction accepted by the instruction-accepting section.

9. An image processing apparatus, comprising:
a job-status report generating section to generate (i) a first job-status report, which indicates a current processing status of a job and which has an image attached thereto, wherein the image includes image information regarding the job, and wherein the first job status report contains information identifying an authorized user, or (ii) a second job-status report, which indicates the current processing status of the job and which does not have an image attached thereto;
a determining section to determine whether the job-status report generating section has generated the first job-status report or the second job-status report;
a storage section to store the first job-status report generated by the job-status report generating section when the determining section determines that the job-status report generating section has generated the first job-status report;
an instruction-accepting section to accept an output instruction for implementing an operation for outputting the first job-status report stored in the storage section, only if the output instruction is inputted via the instruction-accepting section by the authorized user identified in the first job-status report; and
an outputting section to print the first job-status report onto a paper sheet and to output the paper sheet on which the first job status report is printed, in response to the output instruction accepted by the instruction-accepting section from the authorized user identified in the first job-status report;
wherein, with respect to a plurality of jobs inputted by a plurality of authorized users, the job-status report generating section generates respective first job-status reports for every one of the plurality of jobs, and each of the first job-status reports contains information identifying a respective authorized user who is authorized with respect to the job whose status is indicated by the first job status report, such that each of the first job status reports can only be outputted in response to an output instruction accepted by the instruction-accepting section from the respective authorized user identified in the first job-status report.

10. The image processing apparatus of claim 9, further comprising:
a message notification section to notify the authorized user that the first job-status report is generated by the job-status report generating section, when the determining section determines that the job-status report generating section has generated the first job-status report.

11. The image processing apparatus of claim 9, wherein, when the determining section determines that the job-status report generating section has generated the second job-status report, the outputting section prints the second job-status report onto a paper sheet at a time at which a predetermined condition is fulfilled.

12. The image processing apparatus of claim 9, wherein the storage section stores only the first job-status report and does not store the second job-status report.

13. The image processing apparatus of claim 9, wherein the first job-status report is stored in the storage section in correlation with identification information of the authorized user; and wherein the identification information of the authorized user is designated via the instruction-accepting section so as to display index information regarding the first job-status report correlated with the identification information of the authorized user, wherein the first job-status report correlated with the identification information of the authorized user is selected from a plurality of first job-status reports which have respective images attached thereto and are currently stored in the storage section.

14. The image processing apparatus of claim 13, wherein the outputting section prints the first job-status report corresponding to the selected and displayed index information onto the paper sheet.

15. The image processing apparatus of claim 9, wherein the storage section is a box capable of storing image data.

16. The image processing apparatus of claim 15, wherein, before a user is permitted to access the image data stored in the storage section, the user is required to authenticate that the user has authority to access the image data.

17. The image processing apparatus of claim 9, wherein, when accepting the output instruction for implementing the operation for outputting the first job-status report, the instruction-accepting section authenticates that the authorized user has authority to issue the output instruction.

18. The image processing apparatus of claim 9, further comprising:

a setting section to set either a first mode in which the first job-status report is outputted only when the instruction-accepting section accepts the output instruction, or a second mode in which the first job-status report is outputted irrespective of presence or absence of the output instruction accepted by the instruction-accepting section.

19. An image processing apparatus, comprising:

a job-status report generating section to generate (i) a first job-status report, which indicates a current processing status of a job and which has an image attached thereto, wherein the image includes image information regarding the job, and wherein the first job status report contains information identifying an authorized user, or (ii) a second job-status report, which indicates the current processing status of the job and which does not have an image attached thereto;

a determining section to determine whether the job-status report generating section has generated the first job-status report or the second job-status report;

a message notification section to notify the authorized user that the first job-status report is generated by the job-status report generating section, when the determining section determines that the job-status report generating section has generated the first job-status report;

an instruction-accepting section to accept an output instruction for implementing an operation for outputting the first job-status report, only if the output instruction is inputted via the instruction-accepting section by the authorized user identified in the first job-status report; and an outputting section to print the first job-status report onto a paper sheet and to output the paper sheet on which the first job status report is printed, in response to the output instruction accepted by the instruction-accepting section from the authorized user identified in the first job-status report;

wherein, with respect to a plurality of jobs inputted by a plurality of authorized users, the job-status report generating section generates respective first job-status reports for every one of the plurality of jobs, and each of the first job-status reports contains information identifying a respective authorized user who is authorized with respect to the job whose status is indicated by the first job status report, such that each of the first job status reports can only be outputted in response to an output instruction accepted by the instruction-accepting section from the respective authorized user identified in the first job-status report.

20. The image processing apparatus of claim 19, further comprising:

a storage section to store the first job-status report generated by the job-status report generating section.

21. The image processing apparatus of claim 20, wherein the storage section stores only the first job-status report and does not store the second job-status report.

22. The image processing apparatus of claim 20, wherein the first job-status report is stored in the storage section in correlation with identification information of the authorized user; and wherein the identification information of the authorized user is designated via the instruction-accepting section so as to display index information regarding the first job-status report correlated with the identification information of the authorized user, wherein the first job-status report correlated with the identification information of the authorized user is selected from a plurality of first job-status reports which have respective images attached thereto and are currently stored in the storage section.

23. The image processing apparatus of claim 22, wherein the outputting section prints the first job-status report corresponding to the selected and displayed index information onto the paper sheet.

24. The image processing apparatus of claim 20, wherein the storage section is a box capable of storing image data.

25. The image processing apparatus of claim 24, wherein before a user is permitted to access the image data stored in the storage section, the user is required to authenticate that the user has authority to access the image data.

26. The image processing apparatus of claim 19, wherein, when the determining section determines that the job-status report generating section has generated the second job-status report, the outputting section prints the second job-status report onto a paper sheet at a time at which a predetermined condition is fulfilled.

27. The image processing apparatus of claim 19, wherein, when accepting the output instruction for implementing the operation for outputting the first job-status report, the instruction-accepting section authenticates that the authorized user has authority to issue the output instruction.

28. The image processing apparatus of claim 19, further comprising:

a setting section to set either a first mode in which the first job-status report is outputted only when the instruction-accepting section accepts the output instruction, or a second mode in which the first job-status report is outputted irrespective of presence or absence of the output instruction accepted by the instruction-accepting section.

* * * * *